United States Patent
Amano et al.

(10) Patent No.: US 9,858,071 B2
(45) Date of Patent: *Jan. 2, 2018

(54) APPARATUS AND METHOD FOR SUPPORTING SHARING OF SOURCE CODE

(71) Applicant: International Business Machines Corporation, Armonk, NY (US)

(72) Inventors: Takehiko Amano, Yokohama (JP); Yoshio Horiuchi, Hiratsuka (JP); Takaaki Kawase, Tokyo (JP); Ken Kumagai, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/420,450

(22) Filed: Jan. 31, 2017

(65) Prior Publication Data

US 2017/0139703 A1 May 18, 2017

Related U.S. Application Data

(63) Continuation of application No. 14/753,524, filed on Jun. 29, 2015.

(30) Foreign Application Priority Data

Jul. 31, 2014 (JP) .................................. 2014-156962

(51) Int. Cl.
*G06F 9/44* (2006.01)

(52) U.S. Cl.
CPC ...................................... *G06F 8/71* (2013.01)

(58) Field of Classification Search
None
See application file for complete search history.

(56) References Cited

U.S. PATENT DOCUMENTS

| | | | | |
|---|---|---|---|---|
| 7,451,434 | B1 * | 11/2008 | Blumenthal | G06F 9/544 |
| | | | | 707/999.103 |
| 7,865,578 | B1 * | 1/2011 | Gerraty | H04L 12/40013 |
| | | | | 709/220 |

(Continued)

FOREIGN PATENT DOCUMENTS

| | | |
|---|---|---|
| JP | S 62-72032 A | 4/1987 |
| JP | H 01-316822 A | 12/1989 |
| JP | H 6-28164 A | 2/1994 |
| JP | H 9-319568 A | 12/1997 |
| JP | H 10-91447 A | 4/1998 |

(Continued)

OTHER PUBLICATIONS

Notification of Reasons for Refusal, JP Patent Application No. 2014-156962, dated Jun. 21, 2016, 9 pages.

(Continued)

*Primary Examiner* — Insun Kang
(74) *Attorney, Agent, or Firm* — Nathan M. Rau

(57) ABSTRACT

In a shared change set server, a receiving section receives information on an undetermined change set and information on users sharing the undetermined change set from a terminal device used by a developer who has developed the change set. Subsequently, a shared change set management section prepares a shared change set containing the undetermined change set and information on users sharing the undetermined change set, and stores the shared change set in a shared change set storage section. A transmitting section thereafter transmits information on the shared change set to a terminal device used by a developer sharing the shared change set.

7 Claims, 8 Drawing Sheets

(56) References Cited

U.S. PATENT DOCUMENTS

| | | | | |
|---|---|---|---|---|
| 2008/0140732 | A1* | 6/2008 | Wilson | G06F 17/3023 |
| 2011/0040788 | A1* | 2/2011 | March | G06F 17/30132 |
| | | | | 707/770 |
| 2011/0078658 | A1* | 3/2011 | Misch | G06F 8/71 |
| | | | | 717/121 |
| 2011/0184938 | A1* | 7/2011 | Hill | G06F 8/71 |
| | | | | 707/722 |
| 2012/0011106 | A1* | 1/2012 | Reid | G06F 9/466 |
| | | | | 707/695 |
| 2013/0036400 | A1* | 2/2013 | Bak | G06F 8/71 |
| | | | | 717/101 |
| 2013/0290249 | A1* | 10/2013 | Merriman | G06F 17/30584 |
| | | | | 707/610 |
| 2014/0222758 | A1* | 8/2014 | March | G06F 17/3023 |
| | | | | 707/638 |
| 2015/0074506 | A1* | 3/2015 | Dunn | G06F 21/6218 |
| | | | | 715/230 |
| 2015/0261805 | A1* | 9/2015 | Lee | G06F 17/30353 |
| | | | | 707/703 |
| 2015/0370554 | A1* | 12/2015 | Benedict | G06F 11/3692 |
| | | | | 717/101 |
| 2016/0232197 | A1* | 8/2016 | Vaquero Gonzalez | G06F 3/0619 |

FOREIGN PATENT DOCUMENTS

| | | |
|---|---|---|
| JP | 2004-280315 A | 10/2004 |
| JP | 2005-346660 A | 12/2005 |
| JP | 2010-237870 A | 10/2010 |
| JP | 2012-118674 A | 6/2012 |
| JP | 2012-174095 A | 9/2012 |

OTHER PUBLICATIONS

Office Action, Partial Translation—portions that apply to NPL references 1-4, JP Patent Application No. 201-156962, dated Jun. 21, 2016, 2 pages.

"Gobby, a collaborative text editor", © 2005-2015 0x539 dev group, printed on Apr. 20, 2015, 2 pages, <https://gobby.github.io/0>.

"Google Docs", Google, printed on Jun. 10, 2015, 8 pages, <https://www.google.com/docs/about/>.

Decision to Grant a Patent, JP Patent Application No. 2014-156962, dated Sep. 20, 2016.

Amano et al., "Apparatus and Method for Supporting Sharing of Source Code," U.S. Appl. No. 14/753,524, filed Jun. 29, 2015.

List of IBM Patents or Patent Applications Treated as Related, Signed Jan. 31, 2017, 2 pages.

* cited by examiner

APPARATUS AND METHOD FOR SUPPORTING SHARING OF SOURCE CODE

BACKGROUND OF INVENTION

The present invention relates generally to the field of software development. More particularly, the present invention relates to an apparatus and method for supporting a plurality of users in sharing source code.

In many cases of software development projects, a plurality of developers take charge of one operation (task) and operations performed by the developers are related closely to each other. For example, a developer develops source code and a different developer develops code for a unit test on the source code. In such a case, development of test code adapted to source code is required. A need therefore arises for sharing of source code among a plurality of developers. A software configuration management tool is used for sharing of source code.

It is known by JP2012-118674A to construct, on a server in a computing environment having at least two clients and the server connected to the clients through a network, a clone of a local environment for an application executed on one of the at least two clients.

JP6-28164A by Kazuo discloses a software distributed joint development support system formed by connecting a plurality of group joint operation agents by a communication line through a multipoint communication server. Each group joint operation agent includes a communication server that performs information communication, a basic operation support server that supports basic operations, a multi-party conference server that supports a multi-party conference, a software development support server that supports a software development business, a communication information database that manages information for communication executed by communication servers, a basic operation knowledge database that manages knowledge for basic operations performed by the basic operation support server, a conference knowledge database that manages knowledge about conferences performed by the multi-party conference server, a software development knowledge database that manages knowledge about software development performed by the software development support server, and an integrated user interface that directly exchanges information with users.

A technique to perform source code change management is also known by JP2005-346660A by Hiroyuki, which discloses a source code management server including syntactic analysis means for performing syntactic analysis of a source code file received from a client terminal to decompose the source code into a syntactic tree, repository editing means for extracting a change difference of each syntactic tree element from the source code file in the preceding version of the source code file, and a repository information holding section that holds the change difference.

SUMMARY

According to the present invention, there is provided an apparatus for supporting a plurality of users in sharing source code, including a receiving section receiving undetermined change information from a first terminal used by a first user, the undetermined change information being information prepared by the first user and indicating an undetermined change to the source code, an identification section identifying a second user sharing the undetermined change information with the first user, and a transmitting section transmitting the undetermined change information to a second terminal used by the second user.

This apparatus further may include a generation section generating shared change information including the undetermined change information and user information designating the second user. The identification section may identify the second user on the basis of the user information included in the shared change information together with the undetermined change information.

In such a case, the receiving section may receive additional change information from the first terminal, the additional change information being information prepared by the first user and indicating an additional change to the source code; the generation section may change the undetermined change information included in the shared change information on the basis of the additional change information; and the transmitting section may transmit the additional change information to the second terminal.

Also, the generation section may generate determined change information by determining the undetermined change indicated by the undetermined change information, and thereafter delete the shared change information, and the transmitting section may transmit to the second terminal information indicating that the determined change information has been generated and information indicating that the shared change information has been deleted.

On the other hand, the apparatus may further include a generation section generating shared change information including first user information indicating the first user and second user information indicating the second user; the identification section may identify the first user and the second user sharing the undetermined change information on the basis of the first user information and the second user information included in the shared change information together with the undetermined change information; and the transmitting section may transmit the shared change information to the first terminal and the second terminal.

In such a case, the receiving section may receive first additional change information from the first terminal, the first additional change information being information prepared by the first user and indicating an additional change to the source code, and may also receive second additional change information from the second terminal, the second additional change information being information prepared by the second user and indicating an additional change to the source code; the generation section may change the undetermined change information included in the shared change information on the basis of the first additional change information and the second additional change information; and the transmitting section may transmit the first additional change information to the second terminal and transmit the second additional change information to the first terminal. Also in such case, the apparatus may further include a recording section recording an amount of operation required for the additional change indicated by the first additional change information and an amount of operation required for the additional change indicated by the second additional change information, separately.

Also, the receiving section may receive from the first terminal determination order information indicating an order issued by the first user to determine the undetermined change indicated by the undetermined change information; the generation section may generate determined change information by determining the undetermined change indicated by the undetermined change information according to the reception of the determination order information, and thereafter delete the shared change information; and the transmitting section may transmit to the second terminal information indicating that the determined change information has been generated and information indicating that the shared change information has been deleted. Also in such a case, when generating the shared change information according to the reception of the undetermined change information prepared by the first user, the generation section may include, in the shared change information, authority information indicating that the first user has the authority to issue the order for determination, and the generation section thereafter changes, before the first user issues the order for determination, the authority information so as to indicate that the second user has the authority to issue the order for determination.

According to the present invention, there is also provided a method for supporting a plurality of users in sharing source code, the method including the steps of receiving undetermined change information from a first terminal used by a first user, the undetermined change information being information prepared by the first user and indicating an undetermined change to the source code, identifying a second user sharing the undetermined change information with the first user, and transmitting the undetermined change information to a second terminal used by the second user.

According to the present invention, there is further provided a program for causing a computer to function as an apparatus for supporting a plurality of users in sharing source code, the program causing the computer to function as a receiving section receiving undetermined change information from a first terminal used by a first user, the undetermined change information being information prepared by the first user and indicating an undetermined change to the source code, an identification section identifying a second user sharing the undetermined change information with the first user, and a transmitting section transmitting the undetermined information to a second terminal used by the second user.

According to the present invention, sharing source code can be realized among a plurality of users, without executing determination operation for determining a change to the source code.

DETAILED DESCRIPTION

A software configuration management tool is utilized for sharing of source code. Sharing the source code by means of a software configuration management tool, however, requires executing a determining operation on a source code management server. That is, there is a need to temporarily store the source code at hand and perform the determining operation to determine changes to the source code. After the determining operation is executed, the source code cannot be corrected. Therefore, execution of the determining operation can be a cause of mixing of unstable source code in the source code management server, inducing building failure or testing failure and hindering the management of a project. In a developer team performing collaborate operations in a close relationship with each other, the determining operation is frequently performed. This can be a bottleneck in the development process. With execution of the determining operation, therefore, there is a problem that the productivity is reduced.

Therefore, a process using personal development branches to minimize the influence on the entire project has also been carried out. Even when such a process is used, there is still a need for the source code determining operation, the management of the branches is also required, and the productivity reduction problem is not solved.

Embodiments of the present invention enable a plurality of users to share source code without performing an operation to determine a change to the source code.

An embodiment of the present invention will be described in detail with reference to the accompanying drawings.

Figure 1:
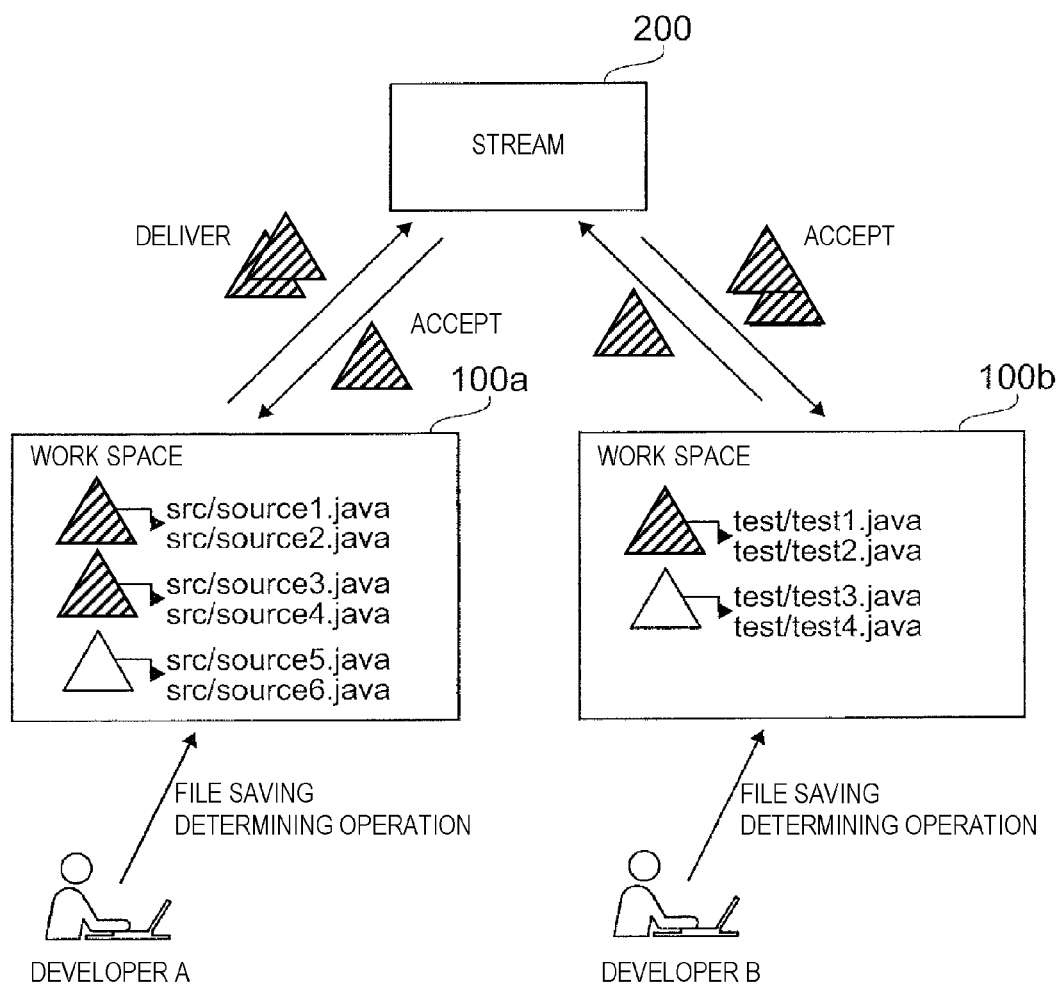
FIG. 1 is a diagram for explaining a problem on an embodiment of the present invention.

FIG. 1 is a diagram for explaining a problem on the present embodiment. This diagram illustrates a situation where a developer A develops source code and a developer B develops test code which is source code for testing the source code developed by the developer A.

The developer A loads the source code in a work space 100*a* in its terminal device and changes the source code. The developer B loads the test code in a work space 100*b* in its terminal device and changes the test code. Information on changes made in this situation is held in units called change sets in each work space, which units are indicated by triangles in the diagram. Each change set is a repository object for collecting changes to files, folders and components in correspondence with related groups and for enabling the changes to be applied to a work space or a stream by one operation. Also, each change set is assumed to have one of attributes: "determined" and "undetermined". In the following, a change set having the attribute "determined" is referred to as "determined change set" and a change set having the attribute "undetermined" is referred to as "undetermined change set".

A determined change set and an undetermined change set will be described. In the diagram, a hatched triangle represents a determined change set while a clear triangle represents an undetermined change set. The developers A and B respectively save source code changed in the work spaces 100*a* and 100*b*. A change, however, is not determined when it is only saved. A change is determined only after a determining operation is performed. A change set is thereby set as a determined change set not alterable thereafter. Only this determined change set is shared through a stream 200 in a source code management server. An undetermined change set on which no determining operation has been performed is not shared.

The diagram shows a state where the developer A has performed an operation to determine two change sets. After the determining operation, no further changes can be made to the source code. The determined change sets are delivered to the stream 200, as illustrated. The developer B then accepts the determined change sets from the stream 200, as illustrated. In a case where the developers A and B respectively perform operations closely related to each other, such delivery and acceptance operations are frequently performed. There is, therefore, a possibility of an instable code entering the stream. The developer B cannot accept undetermined change sets.

In the present embodiment, an undetermined change set is given one of attributes "private" and "shared". That is, the undetermined change sets shown in FIG. 1 are considered as undetermined change sets having the attribute "private", and undetermined change sets having the attribute "shared" are newly provided. In the following, an undetermined change set having the attribute "shared" is referred to particularly as a shared change set. A shared change set can be shared among a plurality of developers before being determined. As a result, troublesome operations in the case where no shared change sets are provided are avoided and the development efficiency is improved.

Figure 2:
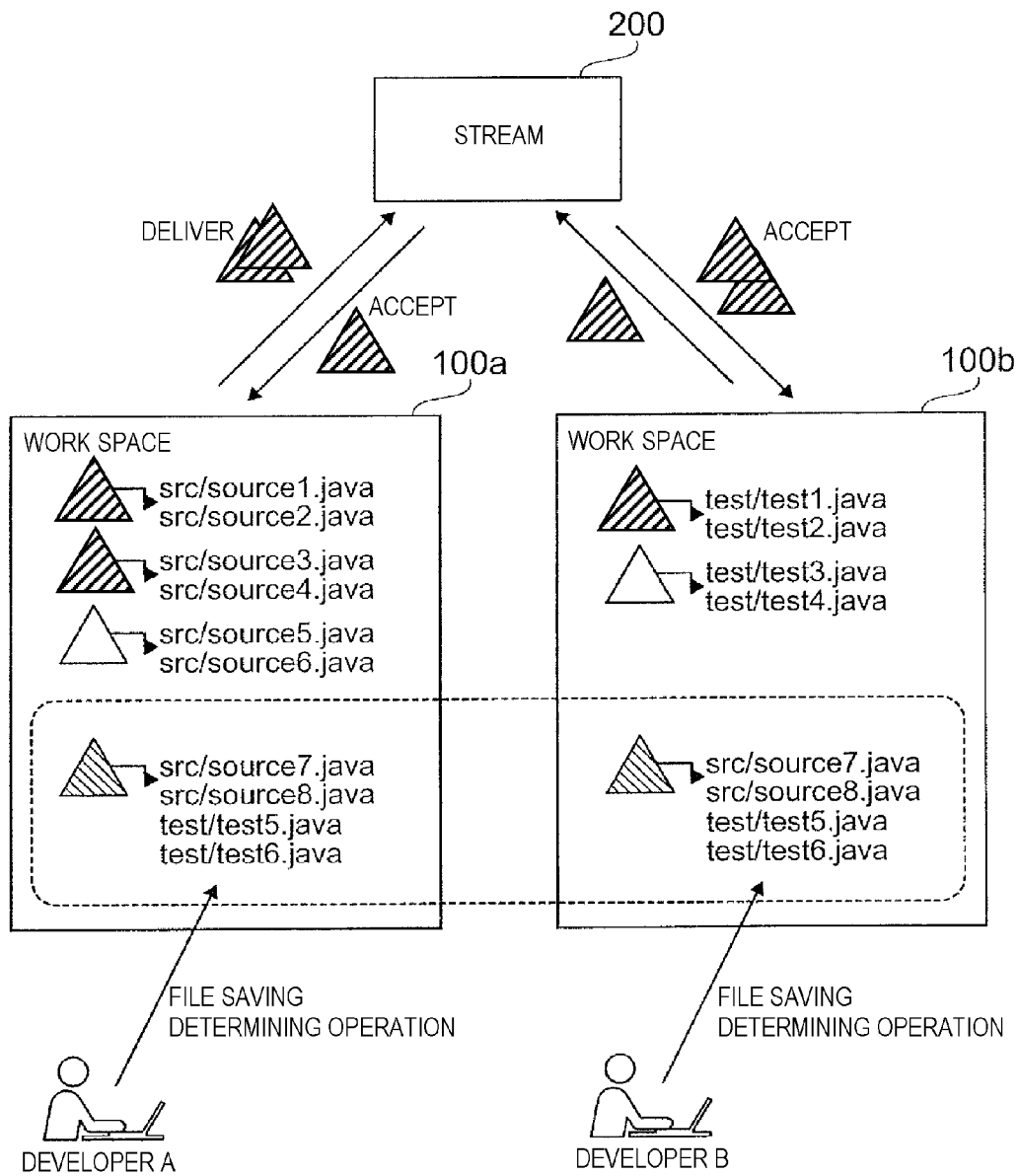
FIG. 2 is a diagram for outlining the embodiment of the present invention.

FIG. 2 is a diagram for outlining the present embodiment. This diagram also illustrates a situation where the developer A develops source code and the developer B develops test code which is source code for testing the source code developed by the developer A.

The developer A loads the source code in a work space 100a in its terminal device and changes the source code. The developer B loads the test code in a work space 100b in its terminal device and changes the test code. Also in this diagram, a hatched triangle represents a determined change set and a clear triangle represents an undetermined change set. An alternatively hatched triangle represents a shared change set newly provided. In this state, a determined change set already tested is accepted, as is that in FIG. 1. An undetermined change set not shared is unseen from other developers. On the other hand, a shared change set in the work space 100a and a shared change set in the work space 100b are shared, as indicated by being surrounded by a dotted line. That is, a change to the shared change set in the work space 100a for example is reflected in real time in the shared change set in the work space 100b. Accordingly, the developers A and B see the same thing as the reality of the shared change set.

Figure 3:
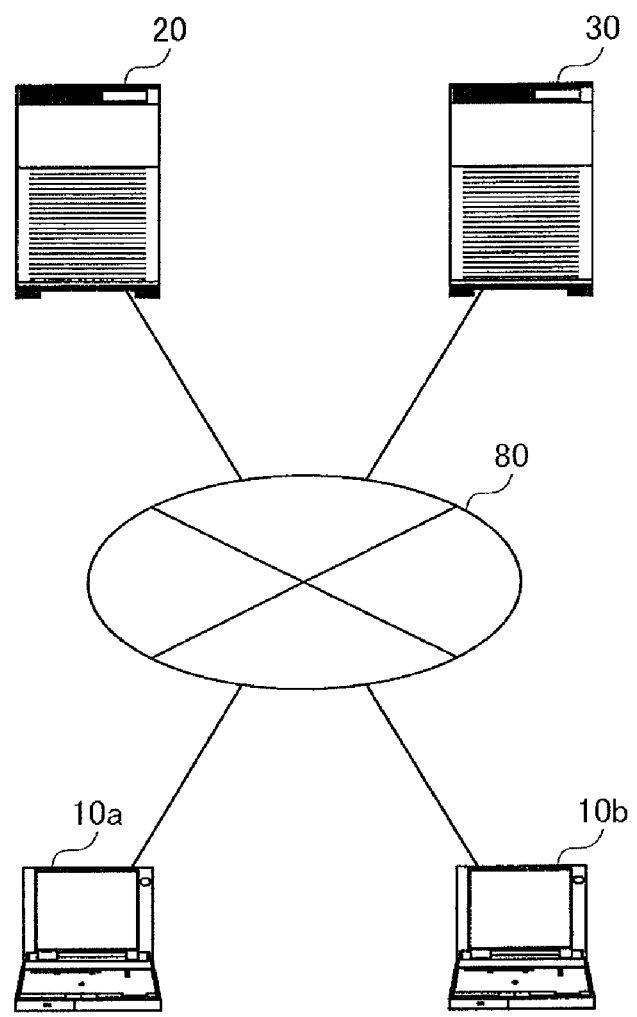
FIG. 3 is a diagram illustrating an example of the configuration of a computer system to which the embodiment of the present invention is applied.

FIG. 3 is a diagram illustrating an example of the configuration of a computer system for realizing the operation thus outlined. As illustrated, this computer system is configured by connecting terminal devices 10a and 10b, a source code management server 20 and a shared change set server 30 to each other through a network 80. While the terminal devices 10a and 10b are illustrated, each of the terminal devices 10a and 10b is referred to as terminal device 10 when it is not necessary to discriminate them from each other. While only two terminal devices 10 are illustrated, three or more terminal devices 10 may be provided.

Each terminal device 10 is a computer unit used by the developer developing source code. More specifically, the developer loads source code from the source code management server 20 in the work space and makes a change to the source code. The developer saves the changed source code and performs a determining operation for determining the change. As terminal device 10, a desk-top personal computer (PC), a notebook PC or the like may preferably be used.

The source code management server 20 is a server computer for managing source code and histories of changes to the source code. More specifically, the source code management server 20 stores source code and transmits the source code to one terminal device 10 when a request is sent from the terminal device 10. Also, the source code management server 20 holds a determined change set delivered from one terminal device 10 and transmits the determined change set to another terminal device 10 when an acceptance request is sent from the another terminal device 10. As source code management server 20, a PC or the like may preferably be used.

The shared change set server 30 is a server computer for realizing sharing and synchronization of shared change sets. More specifically, when receiving a shared change set from one terminal device 10, the shared change set server 30 holds the shared change set and transmits the shared change set to another terminal device 10. Also, when receiving details of a change to be added to a shared change set from one terminal device 10, the shared change set server 30 reflects details of the change to be added in the held shared change set and transmits details of the change to be added to another terminal device 10. Further, when receiving an order for determination of a shared change set from one terminal device 10, the shared change set server 30 generates a determined change set on the basis of the held shared change set, deletes the shared change set and transmits to another terminal device 10 information indicating that the shared change set has been determined and that the shared change set has been deleted. As the shared change set server 30, a PC or the like may preferably be used.

The network 80 is communication means used for information communication among the terminal devices 10, the source code management server 20 and the shared change set server 30. The network 80 is, for example, a local area network (LAN).

Figure 4:
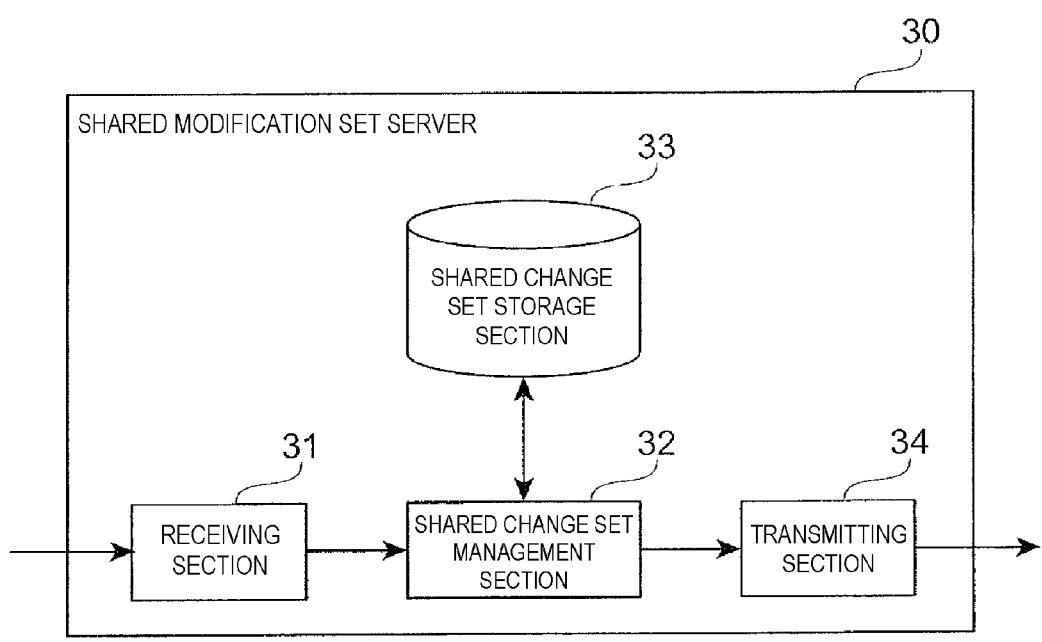
FIG. 4 is a diagram showing an example of a functional configuration of a shared change set server in the embodiment of the present invention.

FIG. 4 is a diagram showing an example of a functional configuration of the shared change set server 30 in the present embodiment. As illustrated, the shared change set server 30 includes a receiving section 31, a shared change set management section 32, a shared change set storage section 33 and a transmitting section 34.

When an order for sharing an undetermined change set is issued from one terminal device 10, the receiving section 31 receives from the terminal device 10 information on the undetermined change set and information on users sharing the undetermined change set. When an order for addition of a change to a shared change set is issued from one terminal device 10, the receiving section 31 receives from the terminal device 10 information on the change to be added to the shared change set. Further, when an order for determination of a shared change set is issued from one terminal device 10, the receiving section 31 receives from the terminal device 10 information on the order for determination of the shared change set. In the present embodiment, an undetermined change set is used as an example of undetermined change information; information on a change to be added is used as an example of additional change information; and information on a determination order is used as an example of determination order information. The receiving section 31 is provided as an example of the receiving section that receives undetermined change information, the receiving section that receives additional change information, or the receiving section that receives determination order information.

When the receiving section 31 receives information on an undetermined change set and information on users sharing this change set, the shared change set management section 32 prepares a shared change set including the undetermined change set and the information on the users, and delivers information on the shared change set and the information on the users to the transmitting section 34. When the receiving section 31 receives information on a change to be added to a shared change set, the shared change set management section 32 adds the additional change to the shared change set, obtains information on a user who has not issued any order for addition of the shared change set in information on users contained in the shared change set, and delivers the information on the additional change and the obtained information on the user to the transmitting section 34. Further, when the receiving section 31 receives information on an order for determination of a shared change set, the shared change set management section 32 delivers the shared change set as a determined change set to the source code management server 20 and deletes the shared change set. Also, the shared change set management section 32 obtains information on a user who has not issued any order for determination of the shared change set in information on users contained in the shared change set, and delivers to the transmitting section 34 information indicating that the shared change set has been delivered, information indicating that the shared change set has been deleted and the obtained information on the user. In the present embodiment, a shared change set is used as an example of shared change information, and a determined change set is used as an example of determined change information. Also, the shared change set management section 32 is provided as an example of the generation section that generates shared change information, the generation section that changes undetermined change information, or the generation section that generates determined change information and thereafter deletes shared change information. Further, the shared change set management section 32 is provided as an example of the identification section that identifies users.

The shared change set storage section 33 stores a shared change set prepared by the shared change set management section 32 while associating the shared change set with a change set ID for identification of the change set.

When the shared change set management section 32 prepares a shared change set, the transmitting section 34 transmits information on the shared change set to the terminal devices 10. When the shared change set management section 32 adds a change to a shared change set, the transmitting section 34 transmits information on the change added to the shared change set to the terminal devices 10. Further, when the shared change set management section 32 delivers a shared change set as a determined change set to the source code management server 20 and deletes the shared change set, the transmitting section 34 transmits information on this operation to the terminal devices 10. When transmitting any of these sorts of information, the transmitting section 34 identifies the addresses of the terminal devices 10 on the basis of information on users received from the shared change set management section 32. In the present embodiment, the transmitting section 34 is provided as an example of the transmitting section that transmits undetermined change information, the transmitting section that transmits additional change information, or the transmitting section that transmits information indicating that determined change information has been generated and information indicating that shared change information has been deleted.

The operation of the shared change set server 30 having the configuration shown in FIG. 4 will be described. Before the description of the operation, it is assumed that the developer A as an example of the first user is connected from the terminal device 10a as an example of the first terminal to the shared change set server 30, and that the developer B as an example of the second user is connected from the terminal device 10b as an example of the second terminal to the shared change set server 30. It is also assumed that the shared change set server 30 holds information on associations including the association between the user ID for the developer A and an address of the terminal device 10a and the association between the user ID for the developer B and an address of the terminal device 10b.

Figure 5:
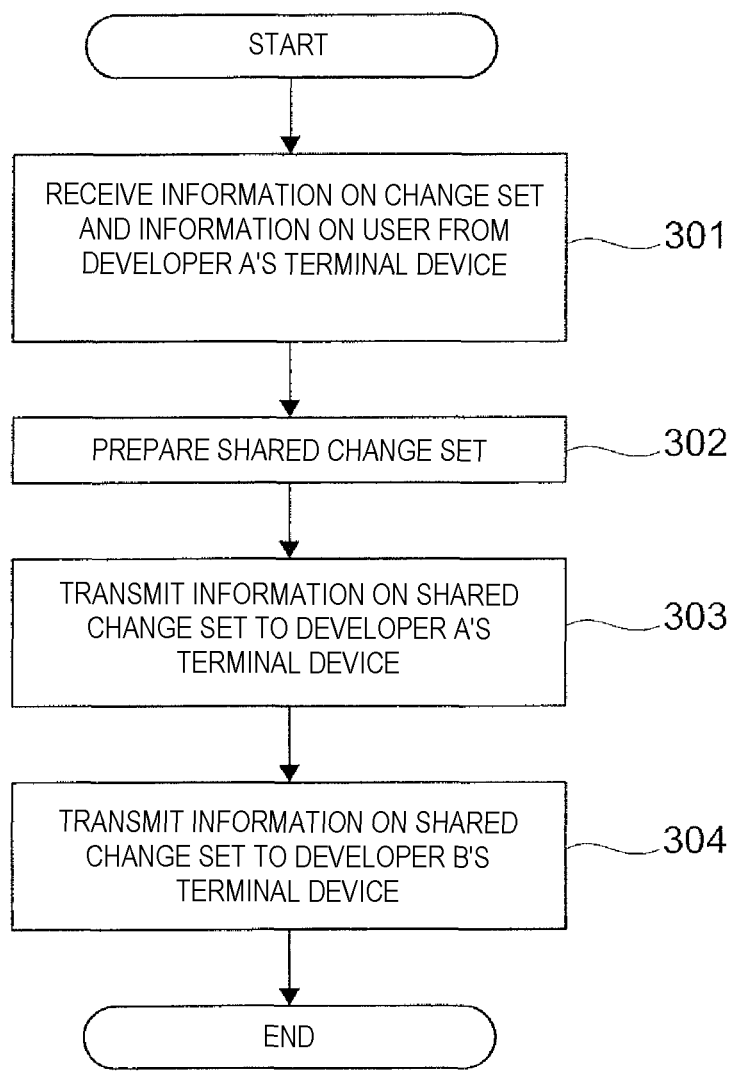
FIG. 5 is a sequence diagram showing an example of the operation when a shared change set is prepared by the shared change set server.

FIG. 5 is a sequence diagram showing an example of the operation when a shared change set is prepared by the shared change set server 30. This operation is started by the developer A preparing a change set and transmitting from the terminal device 10a to the shared change set server 30 an order for sharing with the developer B before determining the change set.

When the terminal device 10a transmits information on a change set and information on users sharing the change set to the shared change set server 30, the receiving section 31 in the shared change set server 30 receives these sorts of information (step 301). In the information on the change set, the change set and the change set ID for identification of the change set may be included. In the information on users, the user ID for the developer B may be included. The user ID for the developer A may be further included in the information on users. However, the user ID for the developer A may be obtained by searching the above-described association information on the basis of the address for the terminal device 10a instead of being explicitly included in the information on users.

Subsequently, in the shared change set server 30, the shared change set management section 32 prepares a shared change set (step 302). In the shared change set, the change set and the user IDs for developers sharing the change set may be included. In the user IDs for developers, the user ID for the developer A and the user ID for the developer B may be included. Information indicating that the user ID is for the developer who has prepared the shared change set may be attached to the user ID for the developer A, and information indicating that the user ID is for a developer other than the developer who has prepared the shared change set may be attached to the user ID for the developer B. The shared change set thus prepared is stored in the shared change set storage section 33 while being associated with the change set ID.

Thereafter, the transmitting section 34 in the shared change set server 30 transmits information on the shared change set to the terminal device 10a (step 303). In the information on the shared change set, the shared change set prepared in step 302 and the change set ID received in step 301 may be included. As the address for the terminal device 10a, an address grasped at the time of receiving information in step 301 may be used. The change set for which sharing is ordered in this example of the operation in change sets held by the terminal device 10a is thereby replaced with the shared change set prepared in step 302.

The transmitting section 34 in the shared change set server 30 also transmits the information on the shared change set to the terminal device 10b (step 304). In the information on the shared change set, the shared change set prepared in step 302 and the change set ID received in step 301 may be included. The address for the terminal device 10b may be obtained by searching the association information on the basis of the user ID for the developer B received in step 301. The shared change set held by the terminal device 10a and the shared change set held by the terminal device 10b are thereby synchronized. At this time, if the developer B has prepared a change set in the terminal device 10b with respect to the same source code, the terminal device 10b may display a user interface (UI) for merging the changes in the change set prepared by the developer A and the changes in the change set prepared by the developer B.

In this example of the operation, the shared change set server 30 sends the shared change set to the terminal device 10a and the terminal device 10b. However, the operation is not limited to this. For example, the operation may be such that the shared change set server 30 sends the undetermined change set to the terminal device 10b but does not send the undetermined change set to the terminal device 10a already holding the undetermined change set.

Figure 6:
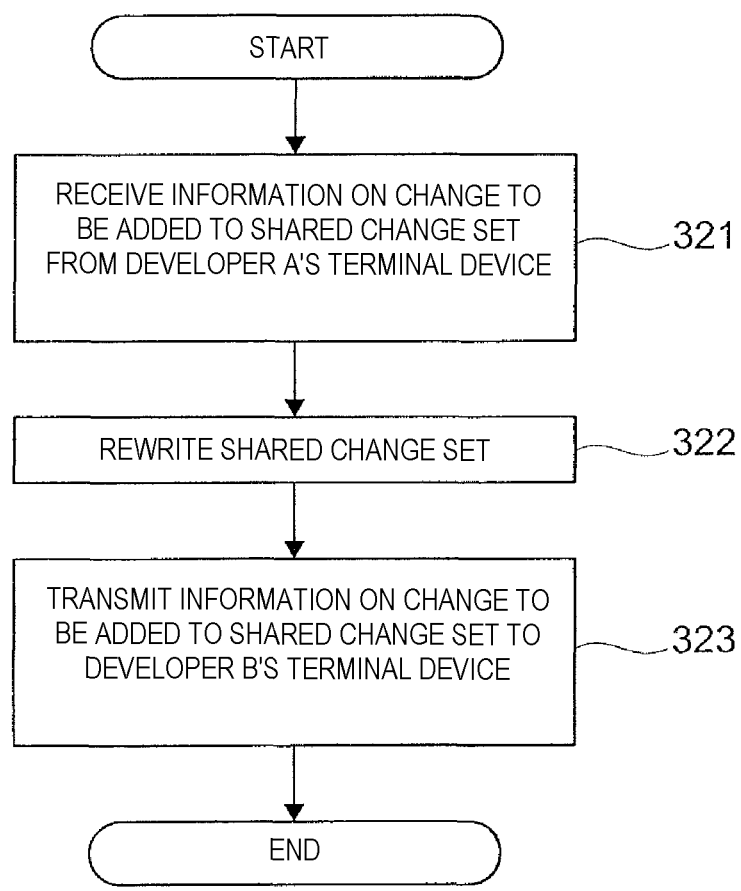
FIG. 6 is a sequence diagram showing an example of the operation when a shared change set is changed in the shared change set server.

FIG. 6 is a sequence diagram showing an example of the operation when a shared change set is changed in the shared change set server 30. This operation is started by the developer A transmitting an order for addition of a change to a shared change set from the terminal device 10a to the shared change set server 30.

When the terminal device 10a transmits information on a change to be added to a shared change set to the shared change set server 30, the receiving section 31 in the shared change set server 30 receives this information (step 321). In the information on the change to be added, details of the change to be added and the change set ID for identification of the shared change set may be included.

Subsequently, in the shared change set server 30, the shared change set management section 32 rewrites the shared change set on the basis of the details of the change to be added (step 322). More specifically, the shared change set stored in the shared change set storage section 33 is identified in association with the change set ID received in step 321, and the identified shared change set is rewritten.

Thereafter, in the shared change set server 30, the transmitting section 34 transmits information on the change to be added to the shared change set to the terminal device 10b (step 323). In the information on the change to be added, details of the change to be added and the change set ID received in step 321 may be included. The address for the terminal device 10b may be obtained in the way described below. First, the shared change set stored in the shared change set storage section 33 is obtained in association with the change set ID received in step 321. Next, the user ID for the developer B contained in the shared change set as a user ID for a developer other than the developer who has prepared the shared change set is obtained and the association information is searched on the basis of this user ID, thereby obtaining the address. The shared change set held by the terminal device 10a and the shared change set held by the terminal device 10b are thereby synchronized. At this time, if the developer B has added a change to the same shared change set in the terminal device 10b, the terminal device 10b may display a user interface (UI) for merging the change added to the shared change set by the developer A and the change added to the shared change set by the developer B.

In this example of the operation, when the terminal device 10a sends information on a change to be added to a shared change set to the shared change set server 30, the shared change set server 30 transmits information on the change to be added to the terminal device 10b. However, the operation is not limited to this. The operation may be such that when the terminal device 10b sends information on a change to be added to the shared change set to the shared change set server 30, the shared change set server 30 sends to the terminal device 10a information on the change to be added.

Figure 7:
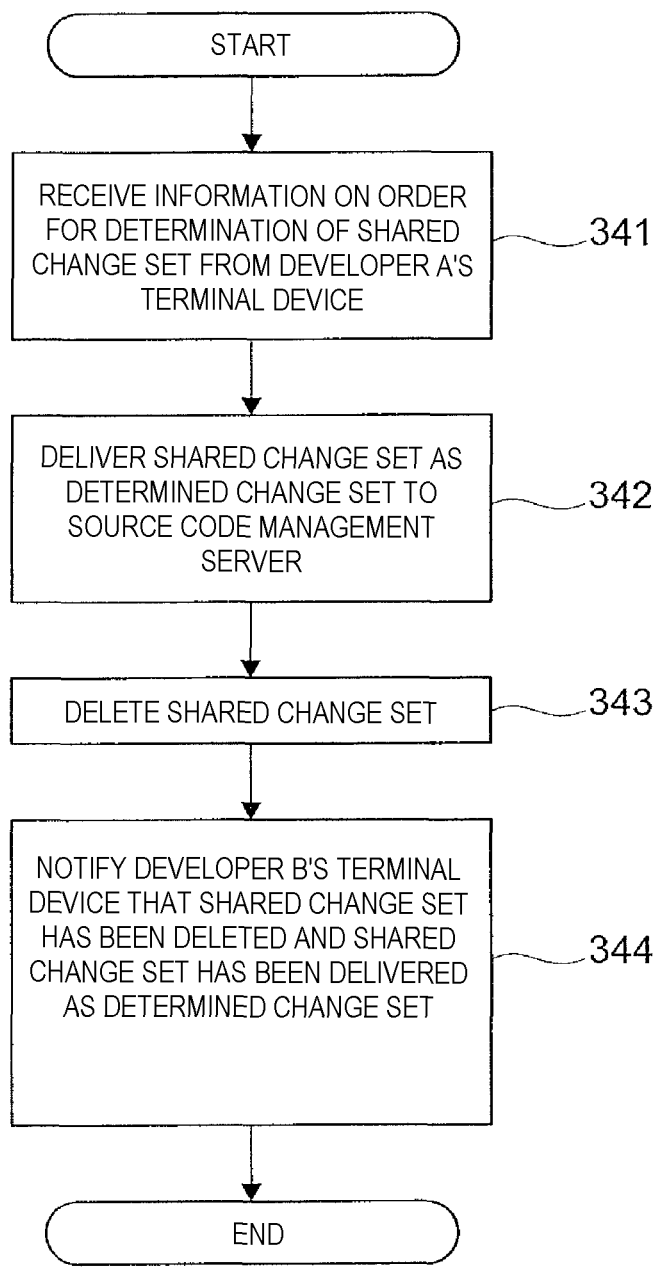
FIG. 7 is a sequence diagram showing an example of the operation when a shared change set is determined in the shared change set server.

FIG. 7 is a sequence diagram showing an example of the operation when a shared change set is determined in the shared change set server 30. This operation is started by the developer A transmitting an order for determination of a shared change set from the terminal device 10a to the shared change set server 30.

When the terminal device 10a transmits information on the order for determination of the shared change set to the shared change set server 30, the receiving section 31 in the shared change set server 30 receives this information (step 341). In the information on the determination order, the change set ID for identification of the shared change set may be included.

Subsequently, in the shared change set server 30, the shared change set management section 32 determines the shared change set and delivers the determined shared change set as a determined change set to the source code management server 20 (step 342).

Subsequently, the shared change set management section 32 deletes the shared change set from the shared change set storage section 33 (step 343). More specifically, the shared change set stored in the shared change set storage section 33 is identified in association with the change set ID received in step 341, and the identified shared change set is deleted.

Thereafter, in the shared change set server 30, the transmitting section 34 notifies the terminal device 10b that the shared change set has been deleted, and that the shared change set has been delivered as a determined change set to the source code management server 20 (step 344). In this notification, a notification of the completion of deletion of the shared change set, a notification of the completion of delivery of the shared change set and the change set ID for identification of the shared change set may be included. The address for the terminal device 10b may be obtained in the way described below. First, the shared change set stored in the shared change set storage section 33 is obtained in association with the change set ID received in step 341. Next, the user ID for the developer B contained in the shared change set as a user ID for a developer other than the developer who has prepared the shared change set is obtained and the association information is searched on the basis of this user ID, thereby obtaining the address. The shared change set is thereby deleted from the terminal device 10b. The terminal device 10b obtains the determined change set delivered from the source code management server 20 in step 342.

A first modified example relates to a setting made by the owner of a shared change set. "Owner of a shared change set" refers to the developer having the authority to carry out the operation to determine a shared change set in developers sharing the shared change set. That is, only the owner of a shared change set can carry out the operation to determine the shared change set. While the owner of a shared change set is the preparer of the shared change set in an initial state, another developer sharing the shared change set may become a new owner of the shared change set. It is assumed that the owner of a shared change set can be changed at any time before determination of the shared change set but cannot be changed after the determining operation.

More specifically, information indicating that the developer A is the owner of a shared change set is included in the shared change set when the shared change set management section 32 prepares the shared change set in step 302 of FIG. 5. Thereafter, the receiving section 31 receives a change order to substitute the owner with the developer B from the terminal device 10a, before the developer A issues a determination order (not shown). Then the shared change set management section 32 may preferably change owner information included in the shared change set so that the owner information indicates that the developer B is the owner. In this case, the owner information is an example of authority information indicating that the user has the authority to issue an order to determine.

A second modified example relates to measurement of the operation time with respect to each developer. It is assumed that metrics of amounts of operation on a shared change set are provided in this modified example. The time periods taken by the developers to collaboratively perform change operations and the amounts of the change operations, for example, are thereby recorded. As the amount of change operation performed, in a case where the object to be measured is a text, the amount of text by which the text is changed by the change operation may be directly used. On the other hand, in a case where the object to be measured is a binary file, it is preferable that the time period taken to prepare the binary file be used after being converted into the amount of text by which the text is changed by the change operation.

More specifically, when the shared change set management section 32 rewrites the shared change set in step 322 in FIG. 6, the amount of rewritten text, for example, may be recorded. In this case, the recording function of the shared change set management section 32 is an example of the recording section that records the amount of operation.

In the present embodiment, collaborative developments can be performed even in a situation where the determining operation (commit, check-in, complete) has not been performed. This can be utilized for pair programming or the like.

In the present embodiment, the amount of operation can be reduced and unstable software components after the completion of the determining operation can also be reduced. The invention therefore has the advantage of reducing building errors so that the degree of influence on other developers conducting tests is lower, and the advantage of enabling leading to an improvement in productivity.

The points of difference from the case where a file server is shared are as described below. First, in the case where a file server is shared, the whole of a file is shared and sharing of only a change set, as in the present embodiment, is not performed. Second, in the case where a file server is shared, an unstable condition may occur as a result of changes made by developers. In the present embodiment, no such a condition occurs. For example, "src/source1.java" in FIG. 1 is determined but is not yet tested. Therefore, if it is shared in a file server, there is a risk of the developer B being largely influenced.

Figure 8:
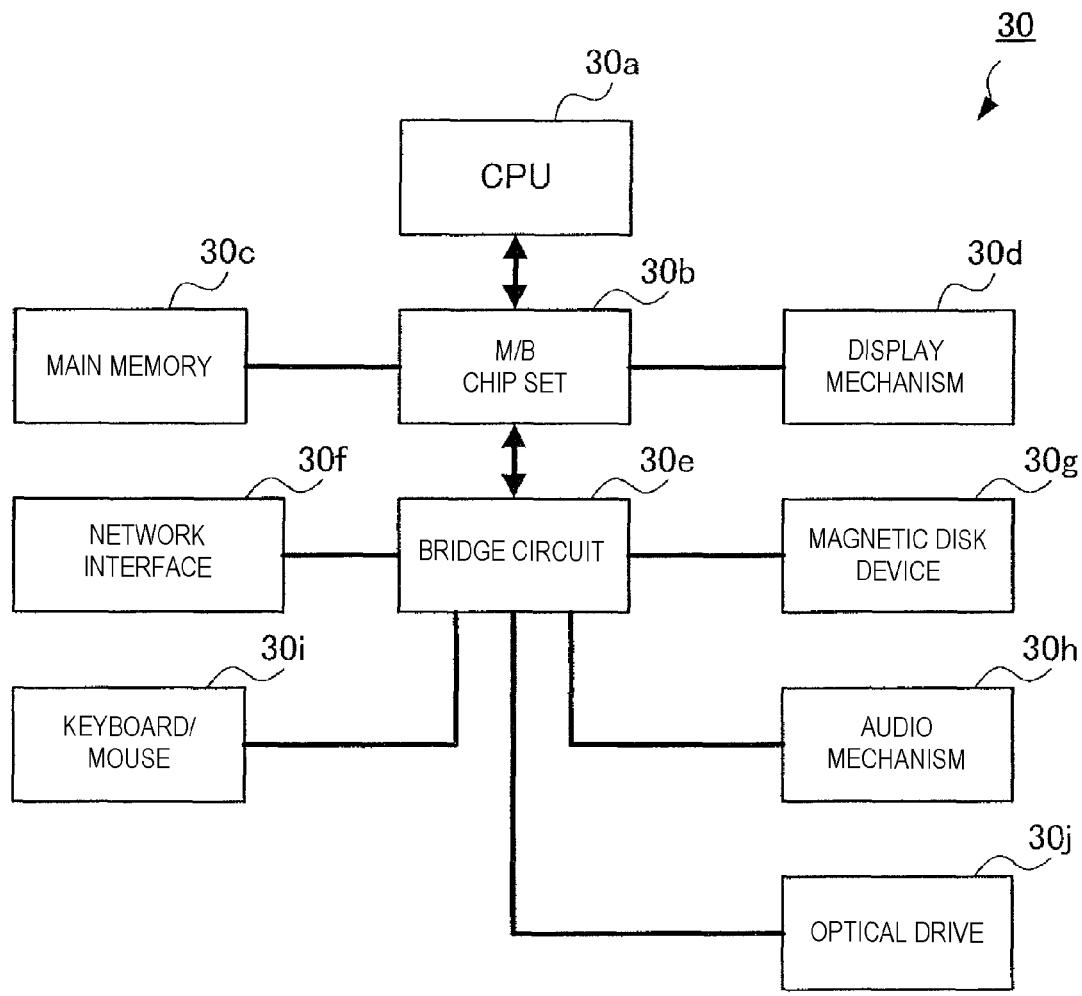
FIG. 8 is a diagram showing an example of a hardware configuration of the shared change set server in the present embodiment.

FIG. 8 is a diagram showing an example of a hardware configuration of the shared change set server 30 in the present embodiment. As shown in the diagram, the shared change set server 30 is provided with a central processing unit (CPU) 30a provided as computation means, a main memory 30c connected to the CPU 30a through a motherboard (MB) chip set 30b, and a display mechanism 30d also connected to the CPU 30a through the M/B chip set 30b. To the M/B chip set 30b are connected a network interface 30f, a magnetic disk device (HDD) 30g, an audio mechanism 30h, a keyboard/mouse 30i and an optical drive 30j through a bridge circuit 30e.

Referring to FIG. 8, the components are connected through buses. For example, the connection between the CPU 30a and the M/B chip set 30b and the connection between the M/B chip set 30b and the main memory 30c are established through a CPU bus. The connection between the M/B chip set 30b and the display mechanism 30d may be established through an Accelerated Graphics Port (AGP). However, if the display mechanism 30d includes a video card compatible with PCI Express, the connection between the M/B chip set 30b and this video card is established through a PCI Express (PCIe) bus. In the case of connection to the bridge circuit 30e, PCI Express for example can be used for the network interface 30f. Also, Serial ATA (AT Attachment), ATA for parallel transfer or Peripheral Components Interconnect (PCI) can be used for the magnetic disk device 30g. Further, Universal Serial Bus (USB) can be used for the keyboard/mouse 30i and the optical drive 30j.

The whole of the present invention may be realized in hardware form or in software form or may be realized by a combination of hardware and software. The present invention can be implemented as a computer, a data processing system or a computer program. The computer program can be provided by being stored on a computer-readable medium. The computer readable storage medium can be any tangible device that can retain and store instructions for use by an instruction execution device. This medium may be an electronic storage device, a magnetic storage device, an optical storage device, an electromagnetic storage device, a semiconductor system (apparatus or device) or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described by using the embodiment, the technical scope of the present invention is not limited to the above-described embodiment. It is apparent for those skilled in the art that various modifications can be made in the embodiment or alternative embodiments can be adopted without departing from the spirit and scope of the present invention.

What is claimed is:

1. An apparatus for supporting a plurality of users in sharing source code, comprising:
   a non-transitory computer-readable storage medium;
   computer program instructions stored on the medium comprising:
   a receiving instruction receiving undetermined change information from a first terminal used by a first user, the undetermined change information being information prepared by the first user and indicating an undetermined change set to the source code, wherein the undetermined change set to the source code is a change to the source code on which a determining operation for determining the change to the source code has not been performed;
   a storing instruction storing a shared change set containing the undetermined change set and a user information;
   a generation instruction generating shared change information on the shared change set, the shared change information including the undetermined change information and the user information;
   an identification instruction identifying a second user sharing the undetermined change information with the first user, based, at least in part, on the user information included in the shared change information together with the undetermined change information;
   a transmitting instruction transmitting the shared change information to a second terminal used by the second user;
   wherein the generation instruction includes, in the shared change information, generating authority information indicating that the first user has the authority to issue an order for determination of the change to the source code by the determining operation, and changing, before the first user issues the order for the determination, the authority information so as to indicate that the second user has the authority to issue the order for the determination; and
   wherein the generation instruction includes, when receiving the order for the determination, generating a determined change set on the basis of the stored shared change set.

2. The apparatus according to claim 1, wherein:
   the receiving instruction receives additional change information from the first terminal, the additional change information being information prepared by the first user and indicating an additional change to the source code;
   the generation instruction changes the undetermined change information included in the shared change information based on the additional change information; and
   the transmitting instruction transmits the additional change information to the second terminal.

3. The apparatus according to claim 1, wherein:
   the generation instruction generates determined change information by determining the undetermined change indicated by the undetermined change information, and thereafter deletes the shared change information; and the transmitting instruction transmits to the second terminal information indicating that the determined change information has been generated and information indicating that the shared change information has been deleted.

4. The apparatus according to claim 1, further comprising a generation instruction generating shared change information including first user information indicating the first user and second user information indicating the second user, wherein:

the identification instruction identifies the first user and the second user sharing the undetermined change information, based, at least in part, on the first user information and the second user information included in the shared change information together with the undetermined change information; and the transmitting instruction transmits the shared change information to the first terminal and the second terminal.

5. The apparatus according to claim 4, wherein:

the receiving instruction receives first additional change information from the first terminal, the first additional change information being information prepared by the first user and indicating a first additional change to the source code;

the receiving instruction receives second additional change information from the second terminal, the second additional change information being information prepared by the second user and indicating a second additional change to the source code;

the generation instruction changes the undetermined change information included in the shared change information based on the first additional change information and the second additional change information; and the transmitting instruction transmits the first additional change information to the second terminal, and transmits the second additional change information to the first terminal.

6. The apparatus according to claim 5, further comprising a recording instruction recording an amount of operation required for the first additional change indicated by the first additional change information and an amount of operation required for the second additional change indicated by the second additional change information.

7. The apparatus according to claim 4, wherein:

the receiving instruction receives from the first terminal determination order information indicating an order issued by the first user to determine the undetermined change set indicated by the undetermined change information;

the generation instruction generates determined change information by determining the undetermined change set indicated by the undetermined change information according to the receiving of the determination order information, and thereafter deletes the shared change information; and the transmitting instruction transmits to the second terminal information indicating that the determined change information has been generated and information indicating that the shared change information has been deleted.

* * * * *